United States Patent [19]

Crossman

[11] 4,237,445
[45] Dec. 2, 1980

[54] TIRE PRESSURE COMMUNICATION DEVICES

[75] Inventor: Richard L. Crossman, Tallmadge, Ohio

[73] Assignee: Goodyear Aerospace Corporation, Akron, Ohio

[21] Appl. No.: 61,580

[22] Filed: Jul. 30, 1979

[51] Int. Cl.³ ............................................. B60C 23/02
[52] U.S. Cl. .................................... 340/58; 200/61.25
[58] Field of Search ............. 340/58; 200/61.22, 61.25

[56] References Cited

U.S. PATENT DOCUMENTS

| | | | |
|---|---|---|---|
| 2,729,712 | 1/1956 | Sprague, Jr. | 340/58 |
| 3,675,198 | 7/1972 | Drown | 340/58 |
| 4,072,926 | 2/1978 | Shimahara et al. | 340/58 |

*Primary Examiner*—Alvin H. Waring
*Attorney, Agent, or Firm*—P. E. Milliken; E. W. Oldham; R. L. Weber

[57] ABSTRACT

Devices for transmitting signals from a rotatable tire to a stationary receiver which correspond to the internal pressure of the tire. In one embodiment, a Bourdon tube communicates with internal tire pressure to regulate the magnetic gap of an electromagnetic induction configuration. Changes in the magnetic gap result in corresponding changes in an output signal strength. In another embodiment of the invention, a bellows is provided in communication with tire pressure for regulating the position of the core of an LVDT. The core position and, accordingly, the output of the LVDT corresponds to tire pressure. In yet another embodiment, strain gauges or other appropriate electrical signal generators are connected to the tire and interconnected with a rotating race. A plurality of ball bearings are maintained in a preloaded condition between the rotating race and a stationary race, the latter race communicating signals to a tire pressure meter or the like.

9 Claims, 3 Drawing Figures

4,237,445

TIRE PRESSURE COMMUNICATION DEVICES

BACKGROUND OF THE INVENTION

The instant invention resides in the art of monitoring devices and is more particularly related to such devices for aircraft. It is extremely important that aircraft tire pressure be known to the pilot to reduce the possibility of blowouts. It is well known that the likelihood of a blowout substantially increases with tire pressure changes above or below a particular desired level, and that such blowouts not only result in a loss of the tire itself, but seriously increase the likelihood of further property damage or human injury.

Heretofore in the art, applicant has not been made aware of any tire pressure monitoring systems which will allow a continual monitoring of the tire pressure during both static and dynamic conditions. Brushes have been used in the past to act as commutators for transferring an electrical signal from a rotating to a stationary member. However, "brush dancing" is experienced when used in the environment of an aircraft wheel and noise or spurious signals are generated which substantially reduce the integrity of the sensing system. Further, brushes are subject to contamination in the wheel environment and are generally characterized by an undesirably high resistance path.

The prior art has also taught certain types of interconnections between rotating and stationary members for transmitting tire pressure signals utilizing an induction technique. However, such systems have generally required close tolerances between the static and dynamic coils, which tolerances must not change with movement of the wheel. Accordingly, concentricity problems have made such systems unsuitable for the aircraft industry.

Other approaches to sensing and transmitting electrical signals indicative of tire pressure have utilized magnets maintained within the wheel, operating upon a magnetic field principle. However, problems have been experienced with the carrying of magnets within the wheel due to size and weight requirements. Such systems have generally not been accepted. Similarly rejected as being insufficient have been the tire pressure indicators utilizing apparatus producing an audible signal. However, such systems have been of a nature that a signal is emitted only during the period that the tire is actually going flat or losing pressure. If the operator is not near the tire or vehicle during the period that pressure is being lost, the signal will not be discerned by anyone and the usefulness of such system will be totally lost.

It has therefore become desirably to provide in the art, a tire pressure communication device which provides substantially noise-free output signals while being of sufficiently simplistic nature that it is capable of operating in the severe environment of an aircraft wheel without reduction of system integrity.

ASPECTS OF THE INVENTION

In light of the foregoing, in accordance with one aspect of the invention, there is provided a tire pressure communication device which, without the presence of noise and spurious signals, communicates a signal indicative of tire pressure from a rotatable tire to a stationary portion of the aircraft.

In accordance with another aspect of the invention, there is provided a tire pressure communication device wherein no brushes are necessary for electrical communication from a rotating to a stationary structure.

In accordance with still another aspect of the invention, there is provided a tire pressure communication device wherein tolerance and concentricity problems incident to the prior art are overcome and in which the prior art problems of contamination from the ambient are substantially reduced.

In accordance with still another aspect of the invention, there are provided tire pressure communication devices which are reliable in operation, relatively simplistic in design, readily conducive to implementation of presently existing aircraft, and easily implemented using state-of-the-art apparatus.

SUMMARY OF THE INVENTION

The foregoing and other aspects of the invention which will become apparent as the detailed description proceeds are achieved by an apparatus for sensing the pressure of an aircraft tire and for communicating such pressure sensing from a rotating tire to a stationary portion of the aircraft, comprising: tire pressure sensing means connected to and rotatable with the tire; signal receiving means fixedly secured to a stationary portion of the aircraft; and communication means interconnected between said sensing means and said receiving means for communicating a signal indicative of tire pressure from said sensing means to said receiving means.

DESCRIPTION OF DRAWINGS

For a complete understanding of the aspects, structure and techniques of the invention reference should be had to the following detailed description and accompanying drawings wherein.

DETAILED DESCRIPTION OF PREFERRED EMBODIMENTS

Figure 1:
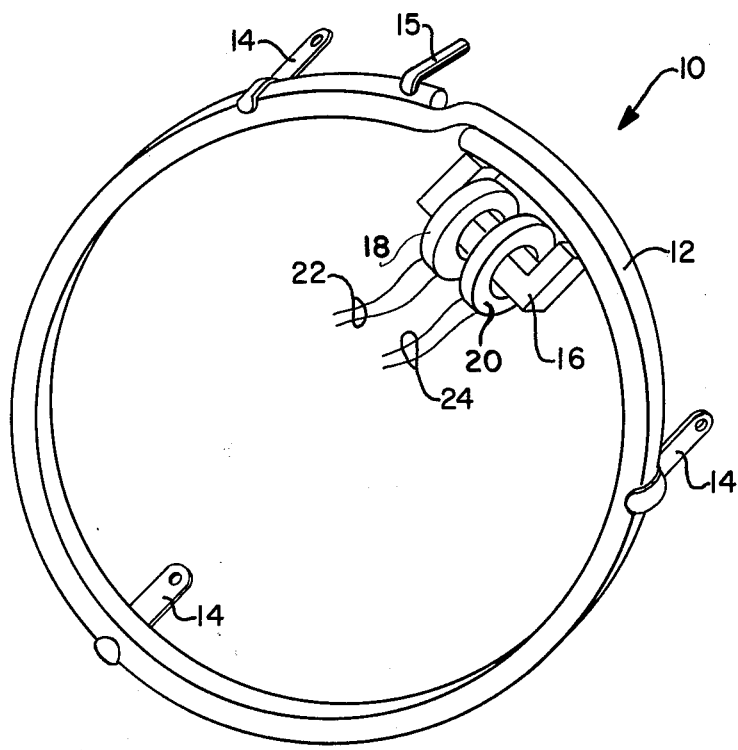
FIG. 1 is an illustrative view of a first embodiment of the invention utilizing a tire pressure-controlled Bourdon tube for regulating a magnetic gap.

Referring now to the drawings and more particularly FIG. 1, it can be seen that a first embodiment of a tire pressure communication device is designated generally by the numeral 10. That device includes a Bourdon tube 12 adapted for interconnection with an aircraft wheel 12 by means of connector straps 14. The connector straps 14 are of a flexible nature and are adaptable for centering and maintaining the tube 12 appropriately within a portion of the wheel housing. Flexibility is desired since, as will be discussed immediately, the diameter of the tube 12 fluctuates with tire pressure and, accordingly, the straps 14 must be flexible to maintain the tube 12 therewithin.

A standard pressure inlet 15 is provided in communication between the tube 12 and the tire. The inlet 15 may pass through the wheel frame and into the envelope defined by the tire and the wheel for making such communication. Such interconnection is, of course, well within the capabilities of one skilled in the art. Accordingly, there is communicated to the Bourdon tube 12, a pressure corresponding to the internal pressure of the associated tire.

A magnetic core piece 16, of suitable material for conducting magnetic flux, is fixedly secured to a nonrotating portion of the aircraft in juxtaposition to the portion of the wheel maintaining the tube 12. While the actual structure to which the core piece 16 will be affixed will vary from aircraft to aircraft, suitable places for maintaining the same would be found on the brake frame, axle, torque tubes, or the like. Suffice it to say that the core piece 16 is so positioned that a magnetic gap is maintained between the faces of the core piece and the Bourdon tube 12 as the wheel carrying the tube is rotated.

Connected about the core piece 16 are inductive coils 18,20. One of these coils, in this case coil 18, is an input coil receiving an electrical signal from an appropriate signal source on the aircraft. This signal is electromagnetically induced into the output core 20, with the signal strength being controlled by the size of the magnetic gap existing between the faces of the core 16 and the tube 12. It will, of course, be understood that the tube 12 is metallic or of other magnetic flux-conducting material In operation, an input signal of fixed signal strength is provided over the input lines 22 to the coil 18. An output signal is induced into the coil 20 and sensed over the output lines 24, with the output signal strength being dependent upon the size of the magnetic gap or the proximity of the tube 12 to the faces of the core piece 16. Such proximity, or size of the magnetic gap, is directly dependent upon the tire pressure communicated via the inlet 15 to the Bourdon tube 12. Accordingly, the signal strength of the output of the coil 20 may be directly correlated with tire pressure.

The benefit of the embodiment of FIG. 1 is that the core piece 16 may be mounted inside, outside, or alongside of the expandable and contractible tube 12. Additionally, the input coil 18 may be excited with a large current so that small variances in concentricity of the tube 12 or in the input signal strength will be relatively unimportant when translated to the output signal of the coil 20. Further, means other than the Bourdon tube 12 might be utilized in the general theme of the invention to effectuate a change in the magnetic gap. For example, the Bourdon tube 12 could be replaced with a bellows in communication with internal tire pressure, such pressure affectuating the expansion or contraction of the bellows which is maintained in juxtaposition with a core piece for regulating a magnetic gap.

Figure 2:
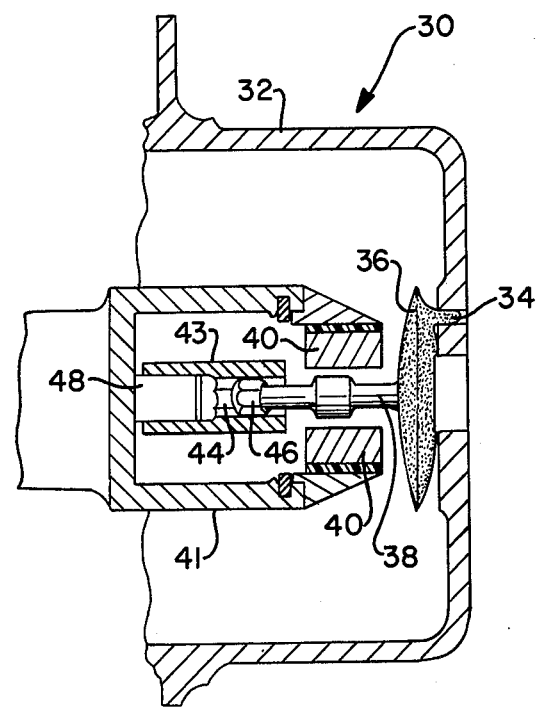
FIG. 2 is a sectional view of another embodiment of the invention wherein tire pressure is used for regulating a bellows which in turn controls the core of an LVDT.

With reference now to FIG. 2, it can be seen that a second embodiment of a tire pressure communication device is designated generally by the numeral 30. Here a wheel frame 32 is provided with a characteristic passageway 34 adapted for communicating tire pressure from the inner cavity of a tire to a bellows 36. The bellows, of rubber, flexible plastic, or other suitably expandable material, is connected to the movable core 38 of an LVDT. The core 38 is selectively positionable in the center of coil 40. These cores are connected to a housing 41 which is fixedly attached to a stationary and nonrotatable member of the aircraft such as an axle, torque tube, brake housing, or the like. A sleeve or guide 43 is maintained by the housing 41 and is adapted for receiving the core 38. In one embodiment of the invention, the core 38 may rotate with the wheel frame 32 in the guide or sleeve 43. The axial position of the core in the center of the coil 40 is controlled by the bellows 36 via tire pressure communicating through the passageway 34.

With continued reference to FIG. 2, it can be seen that the sleeve 43 may be characterized by an internal hexagonal bore 44. In this embodiment, the core 38 is characterized by a spherical hexagonal head 46 adapted for making mating engagement with the bore 44. A driven member 48 or other appropriate shaft is connected to the guide 43 at one end thereof as shown. The other end of the driven member 48 may be connected to the rotor of a wheel speed transducer such as those standardly used in antiskid systems in the aircraft industry. In this embodiment, the core 38 rotates with the wheel 32 and, by means of the mating engagement at 44,46, drives a shaft or other appropriate means 48 for providing a mechanical input signal to a wheel speed transducer.

As briefly mentioned above, the tire pressure communicates to the bellows 36 via the passageway 34 to longitudinally position the core 38 in the center of the coil 40 of the LVDT. The positioning of the core 38 results in a particular output signal from the LVDT in standard fashion, which signal can be applied to appropriate meter means in the cockpit. The core 38 may either be freely rotatable within a guide or sleeve 43 or, alternatively, may be used for driving a wheel speed transducer through mating interconnection with the guide 43.

Figure 3:
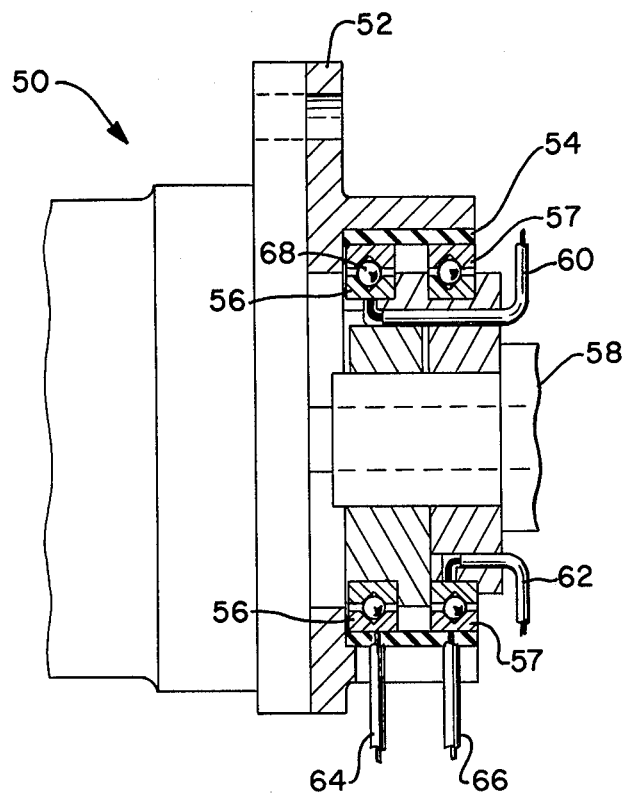
FIG. 3 is a sectional view of a commutator made in accordance with the invention utilizing preloaded ball bearings for achieving necessary electrical communication.

With reference now to FIG. 3, it will be noted that yet another embodiment of a tire pressure communication device is designated generally by the numeral 50. This apparatus includes a stationary housing 52 adapted to be secured to a stationary part of the aircraft such as an axle, brake housing, or the like. A bushing 54 is provided with appropriate insulators to maintain races 56,57 within the housing 52. A driving arm 58, connected to and rotatable with a wheel (not shown), receives an inner portion of each of the races 56,57, while the outer portions thereof are received by the housing 52. Leads 60-66 are interconnected with the races 56,57 with the first two such leads being connected to the inner races and rotatable therewith as driven by the arm 58. These leads may be connected to a standard pressure transducer or appropriate pressure sensing means maintained within the tire itself. Communication from the leads 60,62 is made with the leads 64,66 via ball bearings 68 maintained between the inner and outer portions of the races 56,57.

The ball bearings 68 are maintained between the race surfaces as four-point contact bearings which have been preloaded therebetween. In other words, the inner and outer races are each characterized by "V" grooves such that the ball bearings contact on only two points on each of the "V" surfaces on both the inner and outer race portion. Preloading is accomplished in the standard fashion of thermally assembling the races to achieve forced contacting engagement in a four point pre-loaded manner. Further, the races 56,57 may be packed with a conductive grease serving to both reduce friction and aid in conductivity.

In operation, the leads 60,62 rotate with the inner race portions of the races 56,57 while the wheel is rotating. The leads 60,62 communicate with the pressure transducer to transmit an electrical signal back to the inner race portions which are, in turn, passed across the ball bearings 68 to the outer race portion and thence, by leads 64,66, to appropriate meters in the cockpit.

Of course, a large plurality of ball bearings 68 are maintained by each of the races 56,57 and, with a large plurality of such ball bearings being present, intercommunicating with each other on each race by means of conductive grease and by being thermally preloaded, chatter and bounce are substantially eliminated such that the output signal of the pressure monitor is a pure signal as passed to the meter.

Thus it can be seen that the objects of the invention have been satisfied by the structure presented hereinabove. While in accordance with the patent statutes, only the best modes and preferred embodiments of the invention have been presented and described in detail, it is to be understood that the invention is not limited thereto or thereby. Consequently, for an appreciation of the true scope and breadth of the invention, reference should be had to the appended claims.

What is claimed is:

1. Apparatus for sensing the pressure of an aircraft tire and for communicating such pressure sensing from a rotating tire to a stationary portion of the aircraft, comprising:
   tire pressure sensing means connected to and rotatable with the tire;
   signal receiving means comprising a coil fixedly secured to a stationary portion of the aircraft; and
   communication means comprising a core positioned and movable within said coil and operatively connected to said sensing means for communicating a signal indicative of tire pressure from said sensing means to said coil.

2. The apparatus according to claim 1 wherein said coil is rotatable with the tire, said coil and said core comprising a linear variable differential transformer.

3. The apparatus according to claim 2 wherein said sensing means comprises a bellows in pressure communication with the tire, said bellows being connected to said core.

4. Apparatus for sensing the pressure of an aircraft tire and for communicating such pressure sensing from a rotating tire to a stationary portion of the aircraft, comprising:
   tire pressure sensing means connected to and rotatable with the tire;
   a first electrical coil maintained about a core, said core being fixedly secured to the stationary portion of the aircraft;
   a second coil maintained about said core and in inductive communication with said first coil; and
   an expandable and contractable circular member connected to and rotatable with the wheel, said member rotating in a path in juxtaposition to said core and operative therewith for completing a magnetic circuit for communicating a signal indicative of the tire pressure from said sensing means to said first and second coils.

5. Apparatus for sensing the pressure of an aircraft tire and for communicating such pressure sensing from a rotating tire to a stationary portion of the aircraft, comprising:
   tire pressure sensing means comprising a first set of races connected to and rotatable with the tire;
   signal receiving means comprising a second set of races fixedly secured to a stationary portion of the aircraft; and
   communication means comprising a plurality of ball bearings preloaded between respective pairs of said first and second sets of races, said ball bearings being maintained between said races in four-point contact for communicating a signal indicative of tire pressure from said sensing means to said receiving means.

6. The apparatus according to claim 5 wherein said ball bearings within said races are maintained within an electrically conductive grease.

7. The apparatus according to claim 4 wherein said sensing means comprises an air pressure inlet in communication between the tire and said member, communicating the pressure of the tire to said member.

8. The apparatus according to claim 7 wherein said member comprises a Bourdon tube.

9. The apparatus according to claim 1 wherein said sensing means comprises a first set of races, and said signal receiving means comprises a second set of races.

* * * * *